(No Model.) 2 Sheets—Sheet 1.

J. FRANTZ.
COMBINED CORN PLANTER AND FERTILIZER DISTRIBUTER.

No. 254,207. Patented Feb. 28, 1882.

WITNESSES
INVENTOR (No Model.) 2 Sheets—Sheet 2.

J. FRANTZ.
COMBINED CORN PLANTER AND FERTILIZER DISTRIBUTER.

No. 254,207. Patented Feb. 28, 1882.

WITNESSES
Fred. G. Dieterich
P. C. Dieterich

INVENTOR
Jeremiah Frantz,
by C. A. Snow and Co.
Attorneys

UNITED STATES PATENT OFFICE.

JEREMIAH FRANTZ, OF CENTRE SQUARE, PENNSYLVANIA.

COMBINED CORN-PLANTER AND FERTILIZER-DISTRIBUTER.

SPECIFICATION forming part of Letters Patent No. 254,207, dated February 28, 1882.

Application filed September 15, 1881. (No model.)

*To all whom it may concern:*

Be it known that I, JEREMIAH FRANTZ, of Centre Square, in the county of Montgomery and State of Pennsylvania, have invented certain new and useful Improvements in Combined Corn-Planter and Fertilizer-Distributer; and I do hereby declare that the following is a full, clear, and exact description of the invention, which will enable others skilled in the art to which it appertains to make and use the same, reference being had to the accompanying drawings, which form a part of this specification.

Figure 1:
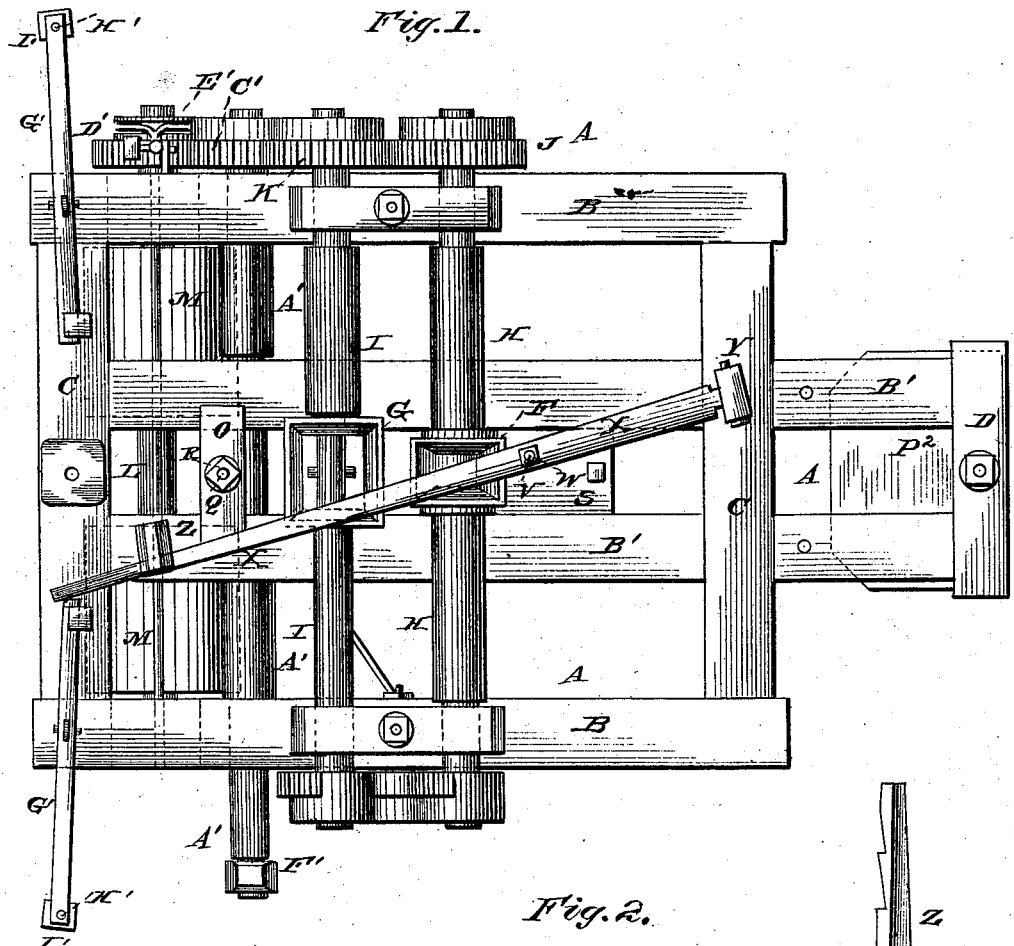
Figure 2:
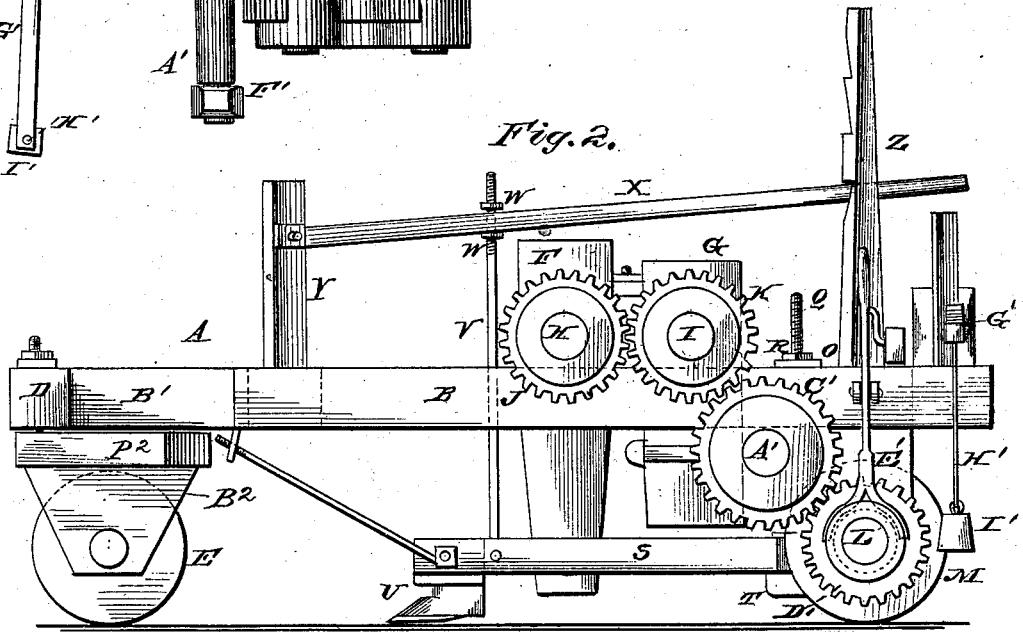
Figure 3:
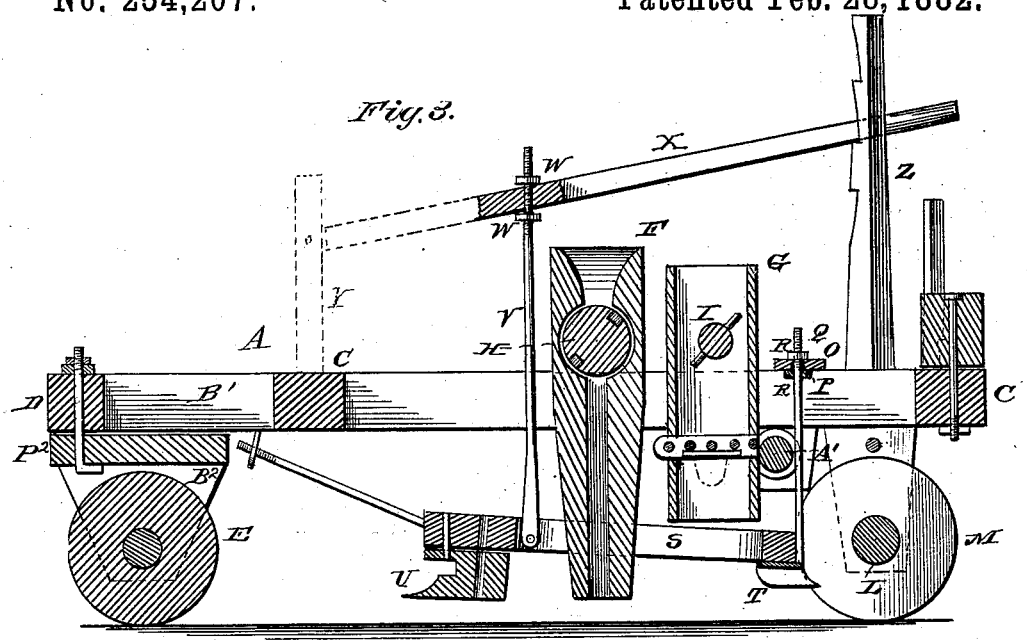
Figure 4:
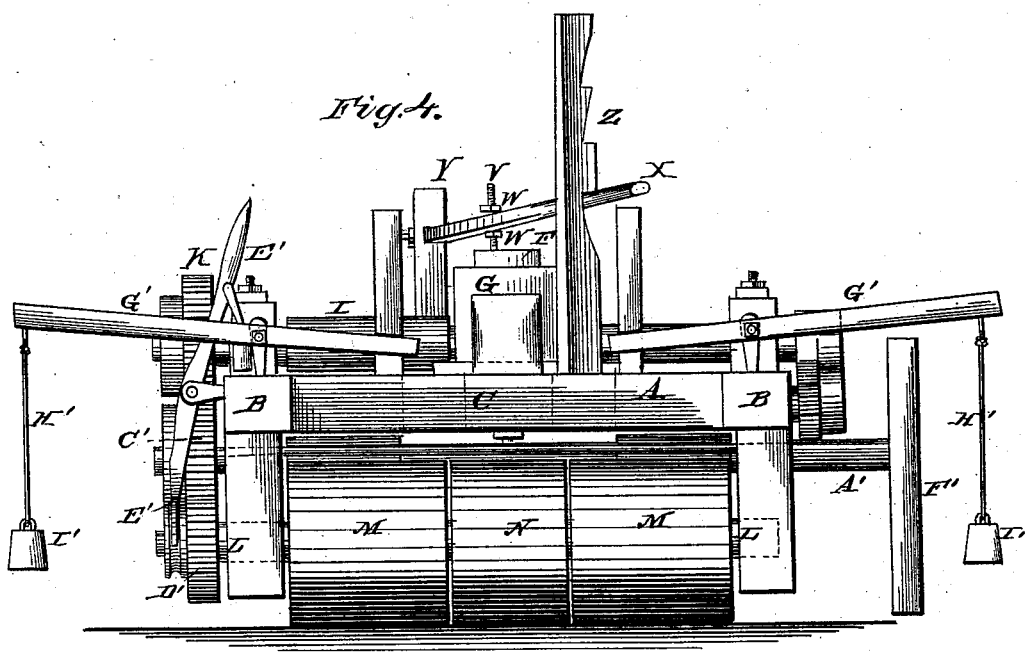

Figure 1 is a top view of my improved cornplanter and fertilizer-distributer. Fig. 2 is a side view of the same; Fig. 3, a longitudinal sectional view. Fig. 4 is a rear view.

Corresponding parts in the several figures are denoted by like letters of reference.

This invention relates to combined cornplanters and fertilizer-distributers; and it consists in certain improvements in the construction of the same, which will be hereinafter fully described, and particularly pointed out in the claim.

In the drawings hereto annexed, A represents a frame constructed of four longitudinal parallel beams, B B', the said beams being connected by transverse beams C, beyond which the central frame-beams, B', project, as shown, in front of the frame. The projections B' are connected by a brace, D, carrying a plate, P², swiveled to brace D by a bolt passing through the front end of said plate, said plate having downward-projecting brackets B², between which is journaled a wheel or roller, E, which serves to level or compact the ground in front of the seeder.

Between the central frame-beams, B' B', are adjusted a pair of hoppers, F G, mounted upon shafts H I, which are journaled in suitable boxes or bearings upon the outer frame-beams. The front hopper, F, is to contain the seedcorn, which may be fed or deposited by any suitable mechanism, and the rear hopper, G, is to feed in a similar manner and at like intervals any suitable fertilizing material. The shafts H I have respectively a drum and stirring-fingers within the hoppers to supply the feed, and they are provided at their ends with pinions or cog-wheels J K, engaging each other, and the latter being operated, as will be hereinafter described, to convey motion to the seeding and fertilizer-dropping mechanism.

Mounted in suitable bearings under the rear end of the main frame is a shaft, L, carrying a pair of rollers, M M, between which space is left for an additional removable roller, N. The rollers M serve not only to level the ground, but also as wheels to the machine, and the removable roller N may be optionally used in case it is desired to compact the ground immediately after planting.

O is a cross-bar connecting the frame-beams B' B' in the rear of the fertilizer-hopper. Said cross-bar O has a central perforation, P, in which a threaded rod, Q, is vertically adjustable by means of nuts R R.

To the lower end of rod Q is attached the rear end of a frame, S, embracing the lower ends of the hoppers or seed-tubes, and carrying the coverers T, which are thus rendered vertically adjustable by adjusting the nuts R R. The front end of frame S carries the furrow-opener U, and is provided with an upward-projecting threaded rod, V, adjustable by nuts W W in a lever, X, pivoted to a standard, Y, of the frame, and having its rear end, which engages a ratchet-bar, Z, within convenient reach of the driver.

A' is a shaft mounted transversely under the seeder-frame, and provided with a pinion, C', engaging the gear-wheel K of the rear seeder or fertilizer shaft. To the pinion C' motion is imparted by a gear, D', which is adjustable upon the drive-shaft L by means of a clutchlever, E', in order that the operation of the seeding mechanism may be started or discontinued at any time by the driver, who has control over the clutch-lever E'.

A check-marker, F', is attached to one end of the shaft A', and levers G' are pivoted to the sides of the frame, near the rear end of the latter, and provided at their outer ends with cords or chains H', having weights I', which drag upon the ground, so as to form indented lines or marks, which may serve to guide the driver of the planter by marking out the course of the next row.

This invention is simple and inexpensive, and its operation and advantages will be readily understood from the foregoing description and by reference to the drawings hereto annexed. The furrow-opener and the coverers may be easily and conveniently adjusted vertically to any desired position, and the entire machine may in a moment's time be thrown out of gear for transportation over the roads.

Having thus described my invention, I claim and desire to secure by Letters Patent of the United States—

The combination of the frame mounted upon rollers M, N, and E, the shafts H I, journaled in said frame and provided respectively with seed-cups and stirring-fingers, the hoppers F G, mounted upon said shafts and having downward extensions or tubes, and suitable operating mechanism, substantially as set forth.

In testimony that I claim the foregoing as my own I have hereto affixed my signature in presence of two witnesses.

JEREMIAH FRANTZ.

Witnesses:
V. H. BAKER,
WM. H. BAKER.